United States Patent Office 2,848,500
Patented Aug. 19, 1958

2,848,500

PREPARATION OF PURIFIED FORMALDEHYDE

Dennis Light Funck, Wilmington, Del., assignor to E. I. du Pont de Nemours and Company, Wilmington, Del., a corporation of Delaware No Drawing. Application January 28, 1957
Serial No. 636,460

15 Claims. (Cl. 260—606)

This invention relates to the preparation of substantially anhydrous formaldehyde.

This is a continuation-in-part of copending patent application Serial No. 433,305, filed by D. L. Funck on May 28, 1954, now abandoned, which, in turn, was a continuation-in-part of copending application Serial No. 368,513, filed by D. L. Funck on July 16, 1953, and now abandoned.

Many attempts have been made to prepare formaldehyde in a pure state by means of distillation techniques. However, formaldehyde is unstable and it reacts with products of the decomposition of formaldehyde as well as impurities which are normally present in formaldehyde solutions, and, thereby, there is produced a variety of undesirable substances, which for many reasons have made the known distillation procedures unsuccessful in producing a purity better than about 98%. In a large majority of the cases, paraformaldehyde, or other low molecular weight polymers of formaldehyde, such as alpha-polyoxymethylene, have been pyrolyzed to produce a monomeric formaldehyde of higher purity. However, even with this procedure, it is difficult to produce monomer having less than about 0.5% to 1% water or other impurities over a sustained period of operation.

It is an object of this invention to provide a novel process whereby a mixture of formaldehyde and water may be separated. It is an object of this invention to provide a process for preparing high quality, substantially pure anhydrous formaldehyde. It is another object to provide a process for converting aqueous formaldehyde to a dehydrated hemiformal and thereafter pyrolyzing the hemiformal to recover a formaldehyde product containing less water than the starting material. It is still another object to provide a method of preparing a cyclohexyl hemiformal mixture which may be thermally decomposed to produce vapors which in turn may be partially condensed to permit the recovery of formaldehyde vapors containing less than 0.1% by weight of water and minute amounts of other impurities. Other objects will appear in the more detailed description of the invention which follows.

The above objects are accomplished in accordance with the process of this invention by forming a reaction product by reacting aqueous formaldehyde with an alcohol having an atmospheric boiling point of at least 95° C., and being substantially free of substituent groups, other than a hydroxyl group, which are reactive with formaldehyde under the process conditions, removing water from this reaction product, thermally decomposing this dehydrated reaction product into vapors, separating the vapors, for example, by partially condensing the vapors to form an alcohol and water condensate, and recovering a vapor product having a higher proportion of formaldehyde to water than that of the aqueous formaldehyde starting material. Normally this product is a formaldehyde vapor containing less than about 0.1% by weight of water.

In the preferred embodiment of this invention a 60% aqueous solution of formaldehyde is reacted with cyclohexanol to form a mixture of cyclohexyl hemiformal, cyclohexanol, small amounts of formaldehyde, water, and polyhemiformals. This aqueous mixture is distilled and the overhead vapors are condensed to form two immiscible layers, the lower layer being primarily water and the upper layer being primarily cyclohexanol. The water layer may be drawn off, treated to recover any cyclohexanol and formaldehyde, while the water is discarded. The cyclohexanol layer may be re-used in the preparation of more cyclohexyl hemiformal or employed as reflux to the distillation vessel. The liquid remaining in the still pot is an equilibrium mixture of cyclohexyl hemiformal, cyclohexanol, small amounts of formaldehyde, water, and polyhemiformals, and this equilibrium mixture shall be referred to herein, generally, as the "hemiformal mixture," and as the "cyclohexyl hemiformal mixture," when the alcohol used to prepare the hemiformal is cyclohexanol. The cyclohexyl hemiformal mixture is pyrolyzed at a temperature from about 125° C. to about 160° C. and the pyrolysis vapors are paratially condensed to produce highly purified formaldehyde. The entire process can be operated continuously by introducing alcohol and aqueous formaldehyde into a distillation column which removes water overhead, refluxes the alcohol, and leaves a bottoms product which is the hemiformal mixture. The hemiformal mixture can be removed continuously and used as a continuous feed to a vaporizer which forms an overhead vapor, which by partial condensation yields purified vaporous formaldehyde, and a condensate of alcohol, the latter of which can be recycled and utilized as a component of the feed stream to the distillation column.

The following is a typical preparation of pure formaldehyde, including batchwise preparation of a cyclohexyl hemiformal mixture and decomposition of the cyclohexyl hemiformal mixture to a purified formaldehyde vapor. The equipment for the preparation of cyclohexyl hemiformal mixture is a stainless steel batch still consisting of (a) kettle with agitator, (b) distillation column of approximately ten theoretical plates, (c) condenser, (d) distillate decanter arranged for upper layer reflux and lower layer draw-off, and (e) steam vauum jets to permit operation at a head pressure of approximately 25 mm. Hg absolute. Into the kettle there is charged 80 pounds of cyclohexanol which has been distilled to remove methanol, if any were present in the raw cyclohexanol. While the agitator is turning, 50 pounds of 60% aqueous formaldehyde solution is added. The kettle is sealed, condenser water and steam jets are turned on, the charge is heated, and the head pressure is adjusted to about 25 mm. Hg absolute. During the first stage of operation the condensate forms two layers, the lower layer being primarily water and the upper layer being primarily cyclohexanol. The lower layer is drawn off, treated by distillation or other means to separate and recover any cyclohexanol and formaldehyde, while the water is discarded, and the upper layer forms the reflux for the distillation column. As the amount of distillate diminishes, the pot temperature will gradually rise, although the temperature should not be allowed to rise over about 85°–95° at 25 mm. of mercury, since under these conditions cyclohexyl hemiformal begins to dissociate into formaldehyde at such a rate that undesirably large quantities of formaldehyde are carried overhead.

As the stripping continues, the rate of formation of lower layer condensate in the condenser will diminish. When it appears that the lower layer condensate ceases to form, the pot contents should contain less than 5000 p. p. m. water. If analysis shows more than 5000 p. p. m. water, the stripping operation may, if desired, be continued at about 82° C. to 85° C. to remove more of the remaining water. It is preferable that the pot contents contain less than about 1.0% by weight water, although subsequent steps of this process are operable if the pot contents contain higher concentrations of water. For most embodiments of this invention, it is desirable to reduce the water content to 0.5% or less.

After the water content of distilling mixture falls below the desired level, which is assumed to be at some value of about 0.5% or less by weight, the cyclohexyl hemiformal mixture is ready for the subsequent pyrolysis step of this process. Since moisture may be picked up readily by the cyclohexyl hemiformal mixture, it is important that the mixture be kept dry if a low water content is to be maintained. The product of the above procedure is that referred to above as the "hemiformal mixture," and is an equilibrium mixture of formaldehyde, alcohol, and the corresponding hemiformal. The mixture in most cases also contains small amounts of water, polyhemiformals, and low molecular weight polymers of formaldehyde. The total combined and uncombined formaldehyde may amount to about 22–23% of the weight of the hemiformal mixture if equimolar amounts of cyclohexanol and formaldehyde are used. However, depending on the alcohol employed in this process, and depending upon whether more or less than equimolar portions of alcohol and formaldehyde are used, the total amount of combined and uncombined formaldehyde in the "hemiformal mixture" may be more or less than 22–23%. In the preferred embodiment described above the alcohol is cyclohexanol and the hemiformal is cyclohexyl hemiformal, and the molar proportion of cyclohexanol to formaldehyde is not more than about 1:1.

In some embodiments of this invention it may be desirable to include an entraining agent in the process for preparing the hemiformal mixture. For example, benzene, cyclohexane, heptane, or other similar compounds are capable of forming azeotropes with water. The proper choice of entraining agent will assist in removing water from the still pot without removing the alcohol. An illustration of this modification is found in Example 8 herein.

Water content of the hemiformal mixture may be determined quantitatively by titration methods using Karl Fischer reagent in dry methanol.

The hemiformal mixture prepared as described above, may be thermally decomposed into vapors of alcohol, formaldehyde, and water, and these vapors may be partially condensed to separate alcohol and water as a liquid condensate from vapors of purified formaldehyde. A particularly desirable apparatus for the decomposition of a hemiformal mixture is a still pot and condenser fitted with a gas separator. The hemiformal mixture is charged, batchwise or continuously, into the still pot which is heated to produce vapors of the alcohol and formaldehyde. The alcohol is condensed to a liquid, and the formaldehyde is drawn off as a vapor.

Hemiformal mixture may be decomposed in a continuous process or in a batch process, the essential difference in operation being that in the former case a steady state of decomposition is reached within a relatively narrow temperature range for the still pot, while in the latter case the temperature of the still pot must be raised as the decomposition progresses, and therefore a relatively wide temperature range is required. The operating temperature for the continuous process will, in general, be about the same temperature as the upper end of the operating temperature range for the batch process.

The following examples are illustrative of some embodiments of the process of this invention. Parts and percentages are by weight unless otherwise noted.

EXAMPLE 1

A typical continuous dehydration of a mixture of 60% formaldehyde and cyclohexanol to yield cyclohexyl hemiformal mixture was made in the following manner: The feed mixture containing approximately 13% water by weight and about equimolar portions of formaldehyde and cyclohexanol was fed continuously at a rate of 10 ml. per minute to a distillation column operated at about 70° C. to 75° C. under 25 mm. Hg absolute pressure. The overhead vapors leaving the column were condensed into two layers. The bottom layer which was drawn off was essentially water containing some formaldehyde and cyclohexanol. The top layer was primarily cyclohexanol containing small amounts of dissolved water and formaldehyde. This top layer was returned to the column as reflux. The cyclohexyl hemiformal mixture was continuously withdrawn from the still pot when the water content of the material in the still pot reached a level of about 0.5% by weight. The formaldehyde carried overhead amounted to about 10 percent of the formaldehyde in the feed stream, and was essentially all recovered in the condensate. Cyclohexyl hemiformal mixtures containing above and below 0.5% water by weight may be prepared by slight variations of this method. The proportion of formaldehyde overhead increases somewhat as the amount of water remaining in the cyclohexyl hemiformal mixture is decreased. The hemiformal mixture made by the process of this example may be pyrolyzed by methods described in other examples to prepare high quality formaldehyde.

EXAMPLE 2

A cyclohexyl hemiformal mixture, made with approximately equimolar proportions of cyclohexanol and formaldehyde in a manner similar to that described in Example 1, was decomposed in a batchwise fashion essentially as follows: A batch of 1 to 1.5 kilograms of cyclohexyl hemiformal mixture containing about 25% by weight of total formaldehyde, including that in the free state and that in the hemiformal, was heated in a still pot fitted with a condenser. At about 125° C. to 130° C. and atmospheric pressure formaldehyde vapors began to evolve at a substantial rate. At temperatures of 140° C. to 155° C. the vapor evolution was 2 to 3 grams per minute. As the pot temperature rose above about 155° C. the formaldehyde vapor evolution decreased to below about 0.5 gram per minute, and the decomposition was stopped at this time. The formaldehyde remaining in the pot amounted to about 4% by weight of the mixture in the pot. The recovery of formaldehyde originally incorporated into the hemiformal mixture was 85% to 90% complete by the above method.

The preferred temperature range for batchwise decomposition of a cyclohexyl hemiformal mixture, as illustrated above, is from about 125° C. to about 160° C., although small amounts of formaldehyde will begin to evolve at about 85° C., at atmospheric pressure. The temperature of the still pot in an operation as described above must be increased steadily in order to cause decomposition of cyclohexyl hemiformal and thereby drive off the formaldehyde. As more and more formaldehyde is released the equilibrium mixture of cyclohexanol, cyclohexyl hemiformal and formaldehyde changes to a greater proportion of cyclohexanol and less proportions of cyclohexyl hemiformal and formaldehyde, thus requiring a higher temperature to release the remaining formaldehyde. When a temperature of about 155° C. to about 160° C. at atmospheric pressure is reached in the process of generating formaldehyde, the mixture in the still pot contains not more than about 4% by weight of formaldehyde and the rate of evolution of the formaldehyde vapors is so small that continuance of the process is impractical.

EXAMPLE 3

In a typical batch decomposition, as described above, employing as a feed a cyclohexyl hemiformal mixture containing about 0.05% water, the formaldehyde gas evolving from the condenser was passed through a series of three U-tubes maintained at about 0° C., the first tube being empty and the last two tubes being filled with an inert packing material. The formaldehyde gas emerging from the last U-tube was analyzed and found to contain the following amounts of the indicated impurities.

| Impurity | Concentration in parts per million (p. p. m.) on a weight basis |
| --- | --- |
| Water | 40 to 80. |
| Methanol | less than 300. |
| Methylal | less than 15. |
| Formic Acid | 0 to 10. |
| Methyl Formate | 20 to 40. |
| Carbon Dioxide | less than 100. |
| Cyclohexanol | less than 30. |

EXAMPLE 4

In another decomposition operation, similar to that described in Example 2, except that a feed hemiformal mixture containing about 0.05% by weight of water was continuously added to the still pot and formaldehyde vapors and spent hemiformal mixture was continuously withdrawn from the system, the formaldehyde gas leaving the condenser was immediately analyzed without allowing the formaldehyde to be passed through a series of cold U-tubes. The results of the analysis are listed below.

| Impurity | Concentration in parts per million (p. p. m.) on a weight basis |
| --- | --- |
| Water | 50 to 150. |
| Methanol | 200 to 400. |
| Methylal | less than 15. |
| Formic Acid | 0 to 20. |
| Methyl Formate | 20 to 40. |
| Carbon Dioxide | less than 100. |
| Cyclohexanol | 100 to 150. |

EXAMPLE 5

In a second continuous decomposition, similar to that described in Example 4, cyclohexyl hemiformal mixture containing 0.5% water by weight was used as feed for the decomposition column. The formaldehyde leaving the condenser contained about 300 p. p. m. water by weight. If the dehydration step is operated so as to reduce the water content of the cyclohexyl hemiformal mixture to only 0.8% (as compared to 0.5% above), and the decomposition is carried out in an identical manner, the formaldehyde gas obtained would contain about 375 p. p. m water by weight.

EXAMPLE 6

It has been found that the concentrations of carbon dioxide and methyl formate can be effectively reduced in the formaldehyde product by a pretreatment of the hemiformal mixture prior to decomposition. The pretreatment which is preferred is a sparaging operation with an inert gas. In one attempt to pretreat a cyclohexyl hemiformal mixture to remove carbon dioxide, 559 grams of the hemiformal mixture, containing 11.6% by weight of formaldehyde, and containing about 2200 p. p. m. of carbon dioxide, based on the formaldehyde content, was sparaged with nitrogen gas for two hours at room temperature and at a nitrogen flow rate of 600 cc. per minute. In the formaldehyde recovered from this hemiformal mixture, carbon dioxide was not detectable by infrared analysis, indicating a concentration of less than 100 p. p. m. In an attempt to reduce the concentration of methyl formate in a hemiformal mixture, nitrogen was sparged through 390 grams of the hemiformal mixture for 90 minutes at 45° C. and at a nitrogen flow rate of 600 cc. per minute. The concentration of methyl formate in the recovered formaldehyde was reduced from 1000 p. p. m. before treatment to 26 p. p. m. after treatment.

EXAMPLE 7

A slurry of 500 grams of paraformaldehyde in 500 grams of dioctyl phthalate was heated at 115°–119° C. by means of a Glascol mantle. The evolved monomeric formaldehyde was passed through one trap maintained at room temperature followed by a series of two traps maintained at 0° C., and then bubbled through 402.6 grams (3 mols) of distilled diethylene glycol monoethyl ether. The latter mixture of ether and pyrolysis vapors was stirred vigorously for a period of 1.75 hours while the temperature was maintained at 20°–26° C. with a water-ice bath. Under these conditions 246.5 grams (8.2 moles) of formaldehyde were absorbed. This is equivalent to 2.73 moles of formaldehyde per mole of diethylene glycol monoethyl ether. The product was clear and stable and was believed to be a polyhemiformal of diethylene glycol monoethyl ether. After 5 days storage at room temperature, 96% of the absorbed formaldehyde was regenerated and recovered by heating the polyhemiformal product to 150°–190° C.

EXAMPLE 8

To 100 grams of a polyhemiformal, prepared as described in Example 7 and containing 2.17 moles of formaldehyde per mole of diethylene glycol monoethyl ether, was added an equal weight of redistilled n-heptane. The two liquids were not miscible. The n-heptane was then removed by distillation at atmospheric pressure (98–101° C.). Monomeric formaldehyde was regenerated from the residual polyhemiformal by pyrolysis at 135–190° C. After passing the regenerated formaldehyde through one trap maintained at room temperature and two traps maintained at 0° C., the monomer was found to contain 47–93 parts per million water by analysis. Monomer regenerated in similar fashion from the same original polyhemiformal which had not been treated with boiling heptane as described above was found to contain 126–183 parts per million of water. As a comparison, the same original polyhemiformal was treated with 25% by weight of "Drierite" for 5 hours at room temperature, and was then pyrolyzed to regenerate formaldehyde. This treatment produced a formaldehyde monomer containing 28–99 parts per million of water.

EXAMPLE 9

In a series of tests, other types of alcohols were employed in the general process described in Example 1. The equipment consisted of a 2-foot Schneider column equipped with a down-flow condenser and designed to operate at atmospheric or subatmospheric pressures. The feed to the column was a mixture of aqueous formaldehyde and an alcohol, which mixture was warmed until it would remain clear at room temperature. The amount of alcohol employed in the process was one mol per mol of formaldehyde plus sufficient alcohol to form a water/alcohol azeotrope. This mixture was charged into the pot of the column and distilled under the conditions shown in the following table so as to remove a large portion of the water. The dehydrated product was then charged into a vessel supplied with enough heat to decompose the dehydrated product into vapors, which, in turn, were partially condensed so as to recover a formaldehyde vapor. The results of decomposition and recovery of formaldehyde are shown in the table. The results do not necessarily represent optimum conditions of recovery or yield, but they do illustrate the operability of other kinds of alcohols.

Table I

| Alcohol | Feed Composition | | | Distillation Conditions | | | Dehydrated Product Composition | | | Decomposition Conditions | | Final Vapor Product | |
|---|---|---|---|---|---|---|---|---|---|---|---|---|---|
| | Percent H₂O Total Basis | Percent HCHO Total Basis | Percent HCHO Alcohol-Free Basis | Pressure | Max. Pot Temp., °C. | Head Temp. Range, °C. | Percent H₂O Total Basis | Percent HCHO Total Basis | Percent HCHO Alcohol-Free Basis | Continuous (C) or Batch (B) | Temp., °C. | Percent H₂O Total Basis | Percent HCHO Total Basis |
| 3-Chloropropanol | 13.3 | 20.4 | 60.5 | 40–50 mm. Hg. | 68 | 27–38 | 1.9 | 13.1 | 87.6 | | (¹) | (¹) | (¹) |
| Benzyl Alcohol | 12.3 | 18.7 | 60.4 | 40 mm. Hg. | 100 | 34–35 | 0.1 | 18.5 | 99.4 | B | Up to 204 | 0.034 | 99.8. |
| Furfuryl Alcohol | 12.8 | 20.2 | 61.2 | 40 mm. Hg. | 91 | 35–38 | 0.3 | 21.5 | 98.8 | C | 158–172 | 0.23 | Appx. 99.8. |
| Beta-hydroxyl Propionitrile | 14.7 | 24.7 | 62.7 | 40 mm. Hg. | 66 | 34–37 | 3.3 | 27.4 | 89.3 | B | Up to 142 | 0.37 | Appx. 99.6. |
| Allyl Alcohol | 12.2 | 18.7 | 60.5 | Atm. | 101 | 82–90 | 6.3 | 25.6 | 80.2 | B | 132 | 0.04 | 99.9. |

¹ A product of 3-chloropropanol and formaldehyde containing 97.5% formaldehyde on an alcohol-free basis was decomposed at 124°–148° C. to produce a vapor containing about 97.8% formaldehyde and 0.09% water.

The process of this invention can be employed to prepare many varieties of hemiformal mixtures, which, in turn, can be decomposed to produce highly purified formaldehyde. The alcohols which may be utilized in the preparation of the hemiformal mixture include any alcohol having an atmospheric boiling point of at least about 95° C., and preferably above about 120° C., and whose molecule is substantially free of substituent groups, other than a hydroxyl group, which are reactive with formaldehyde at the process conditions. Such alcohols may be saturated or unsaturated, unsubstituted or substituted with alkyl, alkoxy, alkoxyalkoxy, hydroxyl, hydroxyalkoxy, halogen, or nitrile groups, but it is important that the molecule does not contain reactive groups, such as a carbonyl group, a nitro group, and an amine group, because of the undesirable side reactions which occur by reason of these groups. Included among the operable alcohols are 3-methyl-1-butanol, 1-hexanol, 2-methyl-1-pentanol, 4-methyl-2-pentanol, methyl hexanol, 1-heptanol, cyclopentanol, cyclohexanol, cycloheptanol, methyl cyclohexanol, ethylene glycol, propylene glycol, diethylene glycol, triethylene glycol mono methyl ether, 2-ethoxy ethanol, 2-butoxy ethanol, 2,2-dimethyl propanol-1, 2-methyl butanol-2, allyl alcohol, benzyl alcohol, 3-chloropropanol, beta-hydroxy propionitrile, furfuryl alcohol, and others which may be apparent to those skilled in the art. Some of the most desirable alcohols are those whose molecules are free of carbonyl groups, such as those in ketones, acids and esters, and consist of carbon, hydrogen, and oxygen. The preferred alcohols are the aliphatic and cycloaliphatic alcohols having 5 to 10 carbon atoms in the molecule, having an atmospheric boiling point above 120° C., and, of these alcohols, the primary and secondary alcohols are most desirable. Lower boiling alcohols are generally not desirable because of the difficulty of obtaining a clean separation between the alcohol and formaldehyde during the decomposition of the hemiformal mixture. It is possible, however, to utilize a lower boiling alcohol in the preparation of a hemiformal mixture, and to effect a reasonable separation of formaldehyde from alcohol in the decomposition operation by operating under pressure. Another alternative is to employ vacuum techniques and thereby alter the operating temperature and permit the use of any of a greater variety of alcohols in this process. Many of the low boiling alcohols form azeotropes with water, and thereby are capable of removing water in a distillation process operated at a temperature below the boiling point of water. Higher boiling alcohols are preferred in this process because of the ease of operation and simplified apparatus accompanying the use of these alcohols.

The reaction of formaldehyde and a suitable alcohol forms a composition which is believed to be primarily an equilibrium mixture of formaldehyde, alcohol, and the corresponding hemiformal, although there may also be present small amounts of water, polyhemiformals and low molecular weight formaldehyde polymers. If only a hemiformal could result from the reaction of these components, formaldehyde could only be utilized in a mol for mol relationship with the alcohol. However, it has been found that in many instances, such as shown in example 7 herein, an equilibrium can be effected with the consumption of more than one mol of formaldehyde for each mol of alcohol. Although it is not known what the formula of such a reaction product may be, it is suspected that the reaction which takes place is the following:

$$ROH + nCH_2O \rightarrow R(CH_2O)_nOH$$

The product of this reaction has been called a polyhemiformal in Example 7. Whatever may be the compounds which are formed, it is known that the reaction of formaldehyde and an alcohol results in an equilibrium mixture which may contain more moles of formaldehyde than moles of alcohol. This equilibrium mixture may then be heated to a temperature causing the hemiformal mixture to be decomposed into vapors, which, in turn, may be partially condensed so as to recover formaldehyde as a vapor and to condense the alcohol to a liquid.

Any concentration of aqueous formaldehyde may be used as the starting material of this process, e. g. 30% or 60% formaldehyde solutions in water are conveniently obtained, and a 37% solution is available commercially. More dilute solutions are operable herein, but are not desirable since other methods may be used for concentration to the 30%–60% range. More concentrated formaldehyde/water compositions, containing as little as 1% water, would be desirable starting materials for this process, but it is believed to be more economical to utilize 30%–60% formaldehyde solutions in this process rather than to employ an expensive concentrating step preceding this process.

The reaction of alcohol and aqueous formaldehyde produces a mixture of alcohol, formaldehyde, water and the corresponding hemiformal. It is at this point that most of the water is removed and separated from a relatively pure hemiformal. Water may be separated from the hemiformal by any known process although distillation techniques are preferred because of convenience in operation and the ease with which such a step may be incorporated into a continuous process. By utilizing a distillation step in the dehydration of hemiformal, water and alcohol may be removed overhead as vapors from a liquid hemiformal mixture. These overhead vapors may be condensed into two liquid layers comprising water in the lower layer and alcohol in the upper layer. The upper layer may be returned to the distillation column as reflux while the lower layer may be discarded after recovering any alcohol and formaldehyde from the water. Regardless of the manner of dehydrating the hemiformal, it is preferable that the water content be reduced to less than about 1% by weight of the hemiformal mixture, in order that the step of thermally decomposing the hemiformal may be accomplished with reasonable efficiency in the production of a substantially pure, anhydrous formaldehyde. It is to be understood, however, that this process is operable even though the hemiformal mixture contains more than 1% water, although such is not the preferred mode of operation if an extremely pure formaldehyde product is desired.

It has been found to be convenient to employ a distillation column for the step of dehydrating the hemiformal mixture. The column may, depending upon the ease of water removal and other conditions, be a simple still pot or it may include a stripping and/or a rectifying section. Furthermore, the distillation may be accomplished in a series of two or more columns. In a single column the dehydration of cyclohexyl hemiformal may be accomplished efficiently employing a head pressure of 20–40 mm. of mercury absolute pressure, and a bottoms temperature of 60°–90° C., depending upon the head pressure. The product from such a column will be a cyclohexyl hemiformal having about 0.5% water. When two columns are employed in series to accomplish the dehydration, both columns may operate with a head pressure of 20–40 mm. of mercury absolute, preferably about 25 mm. The first column may use a bottoms temperature of about 70°–75° C. and the second column may use a bottoms temperature of about 80°–85° C. The product of the first column will contain about 1%–3% water and the product of the second column will contain less than about 0.5% water. It has been found that the use of two columns results in a lower formaldehyde loss than one column, and, therefore, two columns are preferred.

The temperature at which the hemiformal mixture should be decomposed is dependent upon several factors. The various alcohols, which are specified above as operable in this process, will combine with formaldehyde to produce hemiformals which in turn will decompose in temperature ranges that differ from one hemiformal to another. If less than equimolar amounts of alcohol and formaldehyde were used in the preparation of the hemiformal mixture, the decomposition temperature will generally be higher than if equimolar amounts of alcohol and formaldehyde were used. Superatmospheric or subatmospheric pressures may be utilized in this process, and, of course, the decomposition temperature will vary accordingly. As has been explained hereinabove, the temperature ranges for decomposition will likewise be different in a batch decomposition than in a continuous decomposition. The decomposition of hemiformal, in the preferred embodiments of this process operated at atmospheric pressure, will begin to be appreciable at about 85° C. and will increase as the temperature is increased. Catalysts may be incorporated at this point to increase the thermal decomposition rate, lower the decomposition temperature, or to accomplish other advantages. The operating conditions of the condenser are the primary control variables which determine the efficiency of separation of formaldehyde vapors from liquid alcohol, and therefore the thermal decomposition temperature is not a critical part of this process. The preferred temperature ranges for decomposition at atmospheric pressure of a hemiformal mixture, prepared from the preferred alcohols of this process, is from about 85° C. to, or slightly above, the boiling point of the alcohol. In particular, the preferred decomposition temperature of a cyclohexyl hemiformal mixture, containing equimolar proportions of cyclohexanol and formaldehyde, is from about 125° C. to about 160° C. in a batch process, and from about 150° C. to 160° C. in a continuous process.

The vapors generated by the decomposition of a hemiformal mixture comprise formaldehyde, alcohol, and small amounts of water. These vapors must be separated, preferably by partial condensation techniques, so as to remove as much of the alcohol and water as is desired and to leave a purified formaldehyde product. As a guide to efficient operation, it has been found that, when decomposing a cyclohexyl hemiformal mixture containing up to about 0.5% by weight of water, the condenser may be operated at atmospheric pressure and at a temperature such that formaldehyde vapors leaving the condenser are at about 0° C. to about 25° C., and that the formaldehyde vapor product is of the highest purity. It is, of course, apparent that other conditions of temperature and pressure may be utilized to accomplish the same separation of alcohol and formaldehyde.

The preferred embodiment of this invention is a continuous process by means of which alcohol and formaldehyde are reacted to form a hemiformal accompanied by the removal of water. The hemiformal is then thermally decomposed to regenerate formaldehyde. This process is easily operated by utilizing one or more distillation columns, for the preparation and dehydration of the hemiformal, and by employing a vaporizing vessel for decomposing the hemiformal to formaldehyde and alcohol.

Into the distillation column there is fed continuously a mixture of aqueous formaldehyde and a suitable alcohol in any desired molar proportions. These components react to form the corresponding hemiformal mixture which is distilled in this column to remove water as an overhead product which is discarded after recovery of any alcohol or other valuable compounds carried along with the water vapor. The column preferably produces a hemiformal mixture containing less than about 1.0% by weight of water. This column can produce a hemiformal mixture with less water, although to do so there will be a correspondingly reduced yield because more and more formaldehyde, alcohol, and hemiformal will be removed along with the reduction in the water content. In the event that two columns are employed, the first may remove water down to a concentration of about 2%, while the second column may further treat the product of the first column so as to reduce the water content to 0.5% water or less.

The vaporizer, or pyrolyzer, is fed with the bottoms product from the distillation column. The vaporizer is operated at a temperature causing decomposition of the hemiformal mixture to formaldehyde and alcohol. Overhead vapors of formaldehyde, water and some alcohol are passed through a partial condenser which condenses substantially all of the water and alcohol and leaves vapors of formaldehyde which may contain less than 0.05% by weight of water, and, if the process is carefully controlled, the water content may be as low as about 0.005%. The condensate of water and alcohol may be used as a reflux if the vaporizer is a distillation column, but preferably the condensate is removed and added to the feed stream entering the distillation column.

There are a variety of ways of operating the dehydration and pyrolysis steps so as to obtain the desired formaldehyde product. If the dehydration step is operated so as to reduce the water content of the hemiformal mixture considerably below about 0.5%, the recovery of formaldehyde product of that step is materially reduced, but to counterbalance this loss, the pyrolysis step thereby receives a purer feed stream and is able to achieve a very high efficiency in removing the remaining water to produce a higher quality of formaldehyde product. Contrariwise, the dehydration step may be operated with a greater recovery of formaldehyde in the product to produce a hemiformal mixture containing 0.5% to 1.0% by weight of water. This hemiformal mixture, having a relatively high water content, is fed to the pyrolysis step which then must operate more efficiently to remove the remaining water. There are optimum conditions based on the economics of the entire process in the production of any desired purity in the formaldehyde product. Furthermore, this process may be combined with a subsequent partial polymerization of the formaldehyde vapor product to remove even more of the extremely small amounts of water and other impurities present.

The processes of this invention are capable of reducing the concentration of all impurities commonly found in formaldehyde, each to a value of not more than 0.1% by weight. In general, only water and methanol may be present in any amount more than about 0.02% in the purified formaldehyde produced by the processes described herein. By careful operation of the process of this invention, the concentration of water may be reduced to less than 0.01%, and often as low as about 0.005% by weight, although such purity may not be necessary for most utilizations of formaldehyde. Methanol concentrations may be reduced to about 0.02% or less by weight, and other impurities such as methylal, formic acid, methyl formate, and carbon dioxide are repeatedly reduced to concentrations less than 0.01% by the process of this invention, and in some cases as low as 0.001% by weight. Formic acid is a particularly undesirable impurity and it may be reduced by this process to a concentration of less than 0.005% and often to a value of about 0.001% by weight.

The process of this invention may include sparging with nitrogen or other inert gas to effect a reduction in the concentration of carbon dioxide, methyl formate, and other impurities. It is generally convenient to accomplish this by bubbling the inert gas through the hemiformal mixture at a temperature of about 10° C. to 75° C., and preferably at room temperature.

It may also be desirable in some embodiments of this invention to subject the purified formaldehyde produced by the processes described herein to the action of traps, maintained at about 0° C. or less, as an aftertreatment to further reduce the concentration of impurities in the formaldehyde. Other methods of aftertreatment may also be employed.

The formaldehyde produced by the processes of this invention is particularly desirable for use in the preparation of high molecular weight polymers of formaldehyde, although there are many other uses for pure formaldehyde, such as the synthesis of high quality chemicals.

I claim:

1. The process of removing water from a formaldehyde/water composition containing at least 1% by weight of water, which comprises forming a reaction product of said formaldehyde/water composition and an alcohol having an atmospheric boiling point of at least about 95° C. and being substantially free of any substituent group, other than a hydroxyl group, which is reactive with formaldehyde under the process conditions; removing water from said reaction product; and thereafter thermally decomposing said reaction product into vapors comprising formaldehyde and said alcohol, separating the vapors, and recovering a product having a higher proportion of formaldehyde to water than that of said formaldehyde/water composition.

2. The process of claim 1 in which said alcohol is a saturated alcohol.

3. The process of claim 1 in which said formaldehyde/water composition is an aqueous formaldehyde containing at least 30% by weight of formaldehyde.

4. The process of removing water from a mixture of formaldehyde and water, which comprises reacting a feed mixture of water and formaldehyde with an alcohol having an atmospheric boiling point of at least about 95° C., said alcohol being free of carbonyl groups and consisting of carbon, hydrogen, and oxygen, to form a reaction product, removing water from said reaction product, and thereafter thermally decomposing said reaction product into vapors comprising formaldehyde and said alcohol, separating the vapors and recovering a product having a higher proportion of formaldehyde to water than that of said feed mixture of water and formaldehyde.

5. The process of claim 4 in which said alcohol is an unsaturated alcohol.

6. The process of forming a highly purified formaldehyde which comprises reacting a mixture of water and formaldehyde with a saturated alcohol having an atmospheric boiling point of at least about 95° C., and whose molecule is free of carbonyl groups and consists of carbon, hydrogen, and oxygen, to form a reaction product, removing water from said reaction product until the water content is less than about 1% by weight of said reaction product, and thereafter thermally decomposing said reaction product to cause vaporization of said reaction product, partially condensing the resulting vapors, and recovering a highly purified formaldehyde containing less than 0.1% by weight of water.

7. The process of claim 6 in which said alcohol is an aliphatic, including cycloaliphatic, alcohol having 5 to 10 carbon atoms in the molecule, and has an atmospheric boiling point of at least 120° C.

8. The process of claim 6 in which said alcohol is cyclohexanol.

9. The process of claim 6 in which the mixture of water and formaldehyde which is reacted with alcohol is an aqueous solution of formaldehyde, containing from about 30% to about 60% formaldehyde.

10. A process for preparing highly purified formaldehyde which comprises forming a reaction product by reacting aqueous formaldehyde with a saturated alcohol having an atmospheric boiling point of at least 95° C., being free of carbonyl groups, consisting of carbon, hydrogen, and oxygen, and having at least one hydrogen atom attached to the carbon atom to which the hydroxyl group is attached, removing water from said reaction product until the water content is not greater than about 0.5% by weight of said reaction product, sparging said reaction product with an inert gas until the concentrations of methyl formate and carbon dioxide are each less than 0.01% by weight of the total available formaldehyde, and thereafter thermally decomposing said reaction product to form vapors of formaldehyde and said alcohol, partially condensing said vapors at a vapor temperature of about 0° C. to 25° C. at atmospheric pressure, and recovering a highly purified vaporous formaldehyde containing less than 0.1% by weight of water.

11. The process of claim 10 in which said inert gas is nitrogen and said alcohol is cyclohexanol.

12. The process of claim 11 in which said sparging is accomplished at a temperature from 10° C. to 75° C.

13. The process of claim 10 in which said thermal decomposition is accomplished by heating said reaction product at atmospheric pressure and a temperature from about 85° C. to the boiling point of said alcohol.

14. A process for purifying formaldehyde comprising continuously feeding cyclohexanol and an aqueous solution of formaldehyde, containing 30%–60% by weight of formaldehyde, in molar proportions of not more than 1:1 cyclohexanol to formaldehyde, into a distillation column operated at a head pressure of 20–40 mm. of mercury absolute pressure and a bottoms temperature of 60° C.–90° C., condensing the overhead vapors to form a cyclohexanol phase and a water phase, returning said cyclohexanol phase to the distillation column as reflux, recovering cyclohexanol and formaldehyde from said water phase and returning said cyclohexanol and formaldehyde to the feed stream of the distillation column, continuously removing the bottoms product of the distillation column, containing not more than 0.5% by weight of water, and feeding said bottoms product into a vaporizer operated at atmospheric pressure and a temperature of 150° C.–160° C., continuously removing a bottoms product and distilling it to remove high boilers while the remainder is returned to the feed stream of the said distillation column, partially condensing the overhead vapors of said vaporizer at a vapor temperature of 0° C.–25° C. to produce a liquid cyclohexanol phase and a vaporous formaldehyde phase, returning said liquid cyclohexanol phase to the feed stream of said distillation column and recovering vaporous formaldehyde as a product containing less than about 0.05% by weight of water.

15. A process for purifying formaldehyde comprising continuously feeding cyclohexanol and an aqueous solution of formaldehyde, containing 30%–60% by weight of formaldehyde, in molar proportions of not more than 1:1 cyclohexanol to formaldehyde, into a first distillation column operated at a head pressure of about 25 mm. of mercury absolute pressure and a bottoms temperature of about 70° C.–75° C., continuously removing a first bottoms product, containing 1%–3% by weight of water, and feeding said first bottoms product into a second distillation column operated at a head pressure of about 25 mm. of mercury absolute pressure and a bottoms temperature of 80° C.–85° C., combining the overhead vapors of the first distillation column and of the second distillation column and condensing the combined vapors to form a cyclohexanol phase and a water phase, returning the cyclohexanol phase to the first distillation column as reflux, recovering cyclohexanol and formaldehyde from said water phase and returning the said cyclohexanol and formaldehyde to the feed stream of the first distillation column, continuously removing from the second distillation column a second bottoms product containing not more than about 0.5% by weight of water, feeding said second bottoms product into a vaporizer operated at atmospheric pressure and a temperature of 150° C.–160° C., continuously removing a bottoms product and distilling it to remove high boilers while the remainder is returned to the feed stream of the first distillation column, partially condensing the overhead vapors of said vaporizer at a vapor temperature of 0° C.–25° C. to produce a liquid cyclohexanol phase and a vaporous formaldehyde phase, returning said liquid cyclohexanol phase to the feed stream of first said distillation column and recovering vaporous formaldehyde as a product containing less than about 0.05% by weight of water.

No references cited.